(12) United States Patent
Grötheim

(10) Patent No.: US 6,383,367 B1
(45) Date of Patent: May 7, 2002

(54) METHOD AND APPARATUS FOR SEPARATING WATER FROM OIL

(75) Inventor: Jens Grötheim, Oslo (NO)

(73) Assignee: NOR Instruments AS, Oslo (NO)

( * ) Notice: Subject to any disclaimer, the term of this patent is extended or adjusted under 35 U.S.C. 154(b) by 0 days.

(21) Appl. No.: 09/701,177

(22) PCT Filed: May 27, 1999

(86) PCT No.: PCT/NO99/00166

§ 371 Date: Jan. 19, 2001

§ 102(e) Date: Jan. 19, 2001

(87) PCT Pub. No.: WO99/65588

PCT Pub. Date: Dec. 23, 1999

(30) Foreign Application Priority Data

May 28, 1998 (NO) ............................. 19982432

(51) Int. Cl.[7] ............................ C10G 33/00; B01D 3/00
(52) U.S. Cl. ........................ 208/187; 208/188; 210/175; 210/177; 210/180; 210/205; 210/218; 210/220; 210/221.2; 210/767; 210/800; 422/285; 422/288
(58) Field of Search .................. 208/187, 188; 210/767, 175, 177, 180, 205, 218, 220, 221.2, 800; 422/285, 288

(56) References Cited

U.S. PATENT DOCUMENTS

| | | | | |
|---|---|---|---|---|
| 2,076,498 A | * | 4/1937 | Farwell | 208/184 |
| 3,211,535 A | * | 10/1965 | Hirarara | 422/286 |
| 3,448,038 A | * | 6/1969 | Pall et al. | 208/187 |
| 4,019,977 A | * | 4/1977 | Hachadoorian et al. | 208/188 |
| 4,804,471 A | | 2/1989 | Velisavljevic | 210/265 |
| 5,011,597 A | * | 4/1991 | Canzoneri et al. | 210/104 |
| 5,080,780 A | | 1/1992 | Canzoneri et al. | 210/104 |
| 5,211,856 A | | 5/1993 | Shen | 210/799 |
| 5,464,529 A | | 11/1995 | Kozak, III | 210/104 |
| 5,527,461 A | * | 6/1996 | Hill | 210/220 |
| 5,980,694 A | * | 11/1999 | Apeldoorn et al. | 202/152 |
| 6,042,718 A | * | 3/2000 | Bland et al. | 208/187 |

* cited by examiner

Primary Examiner—Walter D. Griffin
(74) Attorney, Agent, or Firm—Wenderoth, Lind & Ponack, L.L.P.

(57) ABSTRACT

A method and apparatus for separating water from oil includes creating a vacuum in a container so that oil which contains water and gas bubbles is drawn upward through a first section of the container. At the top of the first section, the oil impacts a baffle plate, thereby releasing water vapor. The oil then flows downward through an obstruction component in a second section of the container, thereby releasing additional water vapor.

23 Claims, 3 Drawing Sheets

METHOD AND APPARATUS FOR SEPARATING WATER FROM OIL

BACKGROUND OF THE INVENTION

The present invention relates to a method and apparatus for separating water from oil.

Oils are prone to be strongly invaded by water from leaking coolers, condensate in reservoirs, cleaning and steam leakages. Water may reduce viscosity, cause defects of the structural composition of the oil and disturb/destroy additives in the oil. This will result in an accelerating change of the oil (the oil forming water as a result of ageing) and bacterial growth and corrosion, resulting in reduced life of the oil and of the components in which it serves.

U.S. Pat. No. 5,211,856 discloses a method of separating water from oil, in which the oil to be separated is introduced in a heated condition at a predetermined temperature into a container subjected to a vacuum. Gas which is preheated to the temperature of the oil is introduced into the oil in the container to form gas bubbles rising through the oil while absorbing water vapor which, together with the gas in the bubbles, is released in the upper part of the column and withdrawn from the top thereof.

SUMMARY OF THE INVENTION

The object of the present invention is to provide a continuous separation process which, by means of a particularly simple and reliable apparatus, results in a higher efficiency than that of the above and other prior methods of this type. In other words, in a simple manner, the process enables larger amounts of water to be separated per unit time from a certain amount of oil. This object is achieved according to the invention, by a process and apparatus as defined in the claims.

Admittedly, it is a well-known technique to promote evaporation of a liquid by causing it to flow across a large surface area such as packing in a column. However, the present invention provides a surprisingly simple and effective manner of combining the two above-mentioned prior separating principles which, as far as the applicant knows, provides an unsurpassed efficiency in separating water from oil. The invention will also result in a correspondingly effective separation of air or other gaseous contaminations from the oil.

BRIEF DESCRIPTION OF THE DRAWINGS

The invention will now be described in detail with reference to the corresponding schematic drawings in which.

DETAILED DESCRIPTION OF THE INVENTION

Figure 1:
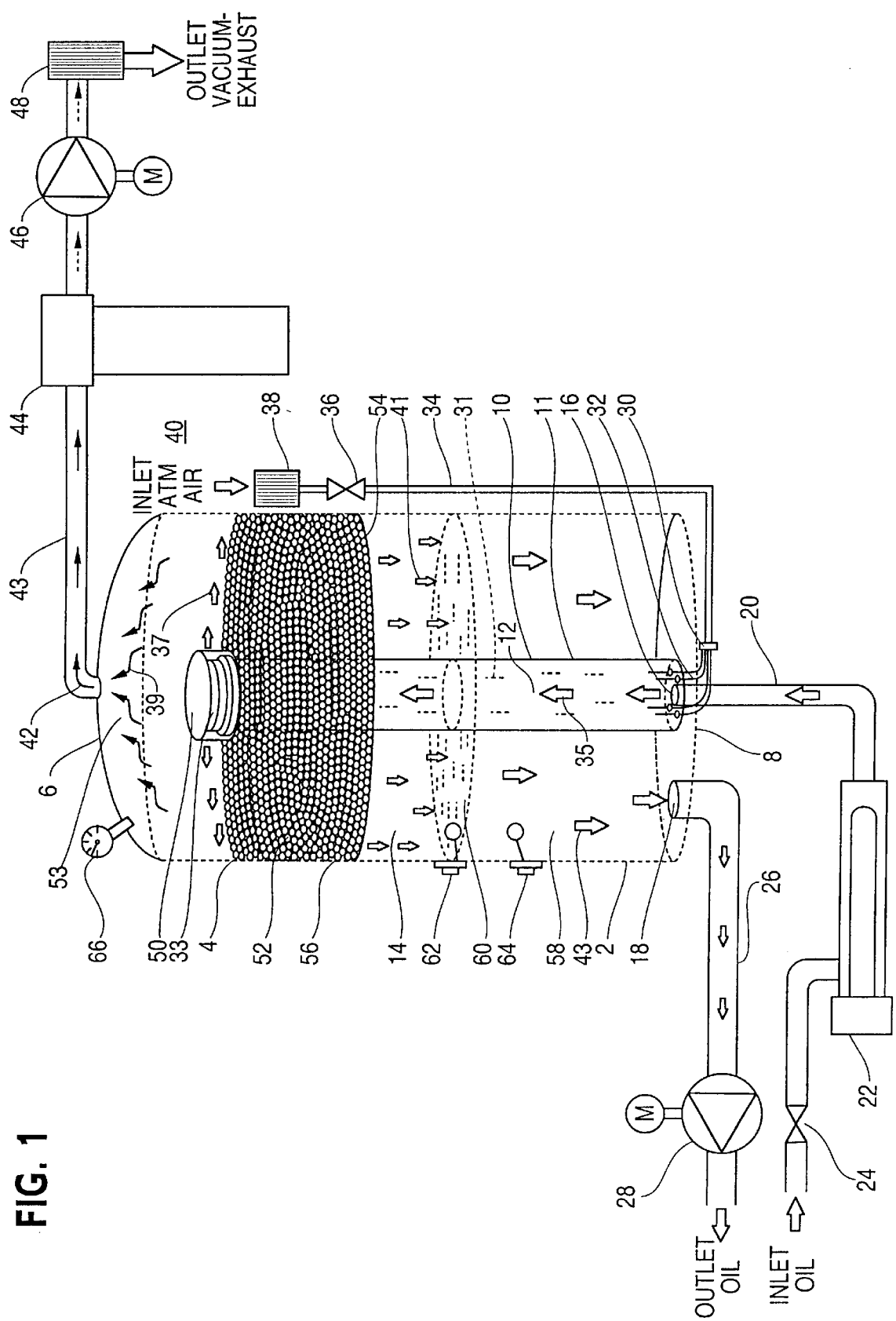
FIG. 1 is a partial perspective view of an embodiment of the apparatus according to the invention.

In FIG. 1 numeral 2 refers to a vertical, preferably cylindrical closed container or "column" having side wall 4, top wall 6 and bottom wall 8. Spaced below top wall 6, the interior of the column is separated by a vertical partition wall 10 into a first section 12 and a second section 14, the latter section having a substantially larger cross sectional area than that of the first section. The partition wall 10 would normally be in the form of a tube 11 centrally or coaxially arranged in the column. In the embodiment shown, the interior of tube 11 will then constitute the first section 12, while the annular space between tube 11 and side wall 4 constitutes the second section 14.

Centrally at the bottom of tube 11, i.e., in the first section 12, there is an inlet 16 for unprocessed (unseparated) oil, and at the bottom of the second section or annular space 14 there is an outlet 18 for processed (separated) oil. The inlet 16 is connected, via an inlet conduit 20 including a heating element 22 and closing or control valve 24, to an oil reservoir (not shown), such as in a lubricating oil system or hydraulic plant. The outlet 18 is connected, via outlet conduit 26 provided with motor 28, to an oil reservoir or tank not shown.

Further, at the bottom of the first section 12 there is a gas inlet 30, preferably in the form of a plurality of nozzles 32 disposed around the central oil inlet 16. The gas inlet 32 is, via a gas supply conduit 34, provided with a flow control valve (such as throttle valve) 36 and cleaning/drying filter 38 connected to a gas source 40 which would normally be surrounded by atmospheric air at about 20° C. The top wall 6 of container 2, which preferably is dome-shaped, is provided with a suction opening 42 for withdrawing gas and liberated water vapor. The suction opening 42 communicates, through a line 43, with a condensing cooler 44, vacuum pump 46 and gas filter 48 discharging to the atmosphere, for example.

Spaced above the first section 12, i.e., above tube 11, there is a circular, substantially horizontal baffle plate 50 having a diameter equal to or somewhat larger than that of tube 11.

In the upper part of the second section or annular space 14 there is an obstruction component 52 having a large surface area serving to impart to the oil flowing across and through the device a correspondingly large surface facing the upper space 53 of the column. In the example shown in the figure, the obstruction component 52 is in the form of packing such as commonly used in columns for evaporation or absorption purposes, supported on a horizontal or slightly downwardly inclined support plate 54 extending radially outward from tube 11 toward side wall 6, with a small gap or clearance 56 between the wall and the edge of the support plate. The packing, however, covers the cross sectional area of the annular space all the way out to side wall 6. Alternatively, the support plate 54 could also extend all the way out to side wall 6, and be provided with perforations permitting oil through-flow.

The operation of the apparatus according to the invention as illustrated in FIG. 1 is as follows.

Vacuum pump 46 is adjusted to provide a vacuum or negative pressure of at least 0.8 bar in column 2. Upon opening of the oil and gas control valves 24 and 36 respectively, the vacuum of column 2 will cause oil and gas (air) to be drawn in through respective inlets 16, 32 at the bottom of tube 11. The inflowing oil is heated by heating element 22 to a temperature which is as high as possible without harming the properties of the oil, e.g., about 60° C., while the inflowing air would be at ambient temperature such as about 20° C.

As a result of the relatively high vacuum in the column, the inflowing oil (as a first stage of the process according to the invention) together with air which while forming bubbles 32 enters through the nozzles 32, will rise as a turbulent, "effervescent" stream 35 through tube 11. The air in the bubbles will rapidly be heated to ambient oil temperature, i.e., a temperature increase of about 40° C., causing the bubbles to expand and thus to achieve a greater surface area or interference with the oil, while the relative humidity of the bubble air is reduced. Consequently, the air of the bubbles will have a drying effect on the oil rising in the inner tube 11 of the column by absorbing the water in the oil.

Thus, already under this first stage of the separating or drying process, a large proportion of the water contained in the oil will be extracted from the oil.

Owing to its relatively high velocity, the upflowing oil 35 will impact or strike against the baffle plate 50 above tube 11, causing the oil to be spread out in a radial layer or film 37 through the peripheral gap 33 between the baffle plate and the upper edge of the tube while the air bubbles in the oil burst. Thus, the water vapor-containing air is released into the upper space 53 of the container 2, and it is withdrawn through suction opening 42 as indicated with arrows 39.

Under the action of gravity, the radially flowing oil layer 37 in the upper space 53 of the column (as a second stage of the separating process according to the invention) will fall down over the underlying obstruction component (which, in this case, comprises packing) and thereby again achieves a very large interface toward the ambient vacuum atmosphere. This results in an effective evaporation of the remaining water contained in the oil and withdrawal of the water vapor through the opening 42.

Upon having sunk through the packing obstruction component 52, the oil flows outward to the edge of support plate 54 and down through gap 56 as indicated with arrows 41, to be collected in the lower part 58 of the second section of the container 14 in a fully processed condition, i.e., substantially liberated from water.

The above described two-stage process, in which tile oil is caused to present a continuously large interface toward a space exposed to a relatively high vacuum, will also act to effectively remove possible air or other fluid contaminations in the oil.

The level 60 of the processed oil in the column is adjusted by upper and lower level gauges 62, 64, respectively. When the level reaches the upper level gauge 62, outlet pump 28 is activated to pump oil 43 from the column until the pump stops when the oil level reaches the lower level gauge 64.

The water vapor-containing gas withdrawn through opening 42 at the top of the column, is separated from water vapor in condensation cooler 44 before reaching the vacuum pump 46, and the exhaust gas from the pump is preferably cleaned in the gas filter 48 before being released to the atmosphere. Alternatively it could go to a closed exhaust system. The vacuum in the upper space of the column can be monitored by means of a manometer 66.

The packing obstruction component 52 could be any material commonly used in chemical engineering for evaporation purposes, such as pall rings made of metal or plastics. However, ordinary "marble balls", i.e., balls of glass or ceramic material, has been found to be a lowcost and effective and therefore preferred packing. Normally, about 2,000 balls having a diameter of about 16 mm would be suitable.

The container 2 with tubular partition wall 10 could be made of any suitable material, such as stainless steel. However, a transparent hard plastic, such as plexiglass® is preferred, since it permits observation of the process and adjustment of the oil and air control valves 24, 36 in a manner ensuring the most favorable flow conditions for obtaining an optimum result. More particularly, the valves are preferably adjusted depending on a predetermined approximate value of the vacuum in the container, as described below in connection with an example of practical use of the invention.

The inlet and outlet conduits 20, 26 of the apparatus will normally be connected to one and the same oil reservoir for continuous operation, such that the oil in the reservoir is maintained in an optimally water and airless condition. However, the inlet 20 may of course, if desirable, be connected to a separate reservoir for unprocessed oil while the outlet 28 discharges to another reservoir or tank for processed oil.

The dimensions of container 2 will be adjusted to the capacity of the plant to be served by the oil. For an oil reservoir having a capacity of about 1,000 litres, the tube 11 can suitably have an inner diameter of about 60 mm and a height of about 800 mm, while the diameter and total height of container 2 can be about 250 mm and about 500 mm, respectively. The vacuum pump 46 should have a capacity of 20 $M^3$/h, and provide a maximum vacuum of down to 0.99 bar (1 mbar absolute).

An example of practical use of such an apparatus in the process according to the invention for processing oil containing about 2 percent by weight of water (20,000 ppm) and a viscosity of about 32 cSt ($32\times10^{-4}$m $^2$/s) is as follows.

With closed oil and air valves 24 and 36 respectively, the vacuum pump 46 and heat element 22 is activated. When manometer 66 indicates a vacuum of about 0.92 bar, oil valve 24 is opened, permitting oil to flow into the column owing to the vacuum. The oil valve 24 is adjusted to provide a flow rate of about 10 l/min. (e.g., by measuring the time elapsed from the time when the upper level gauge 62 starts outlet pump 28 until the lower level gauge 64 stops the pump). When the flow rate reaches the desired value, the vacuum in the column has increased to about 0.92 bar due to the oil flowing through the column. Now the air valve 36 is opened and adjusted such that manometer 66 indicates a vacuum of between 0.75 and 0.85 bar, preferably about 0.80 bar. Inspection of processed oil from the process according to the above example showed that its content of water was reduced to about 0.08 percent by weight (80 ppm). If the oil has a viscosity different from that of the above example, different adjustments of the valves may be needed. Although the valves 24 and 36 according to the above example are adjusted when the process is started, it is of course possible to provide the valves with a fixed optimum pre-adjustment for a particular type of oil.

Figure 2:
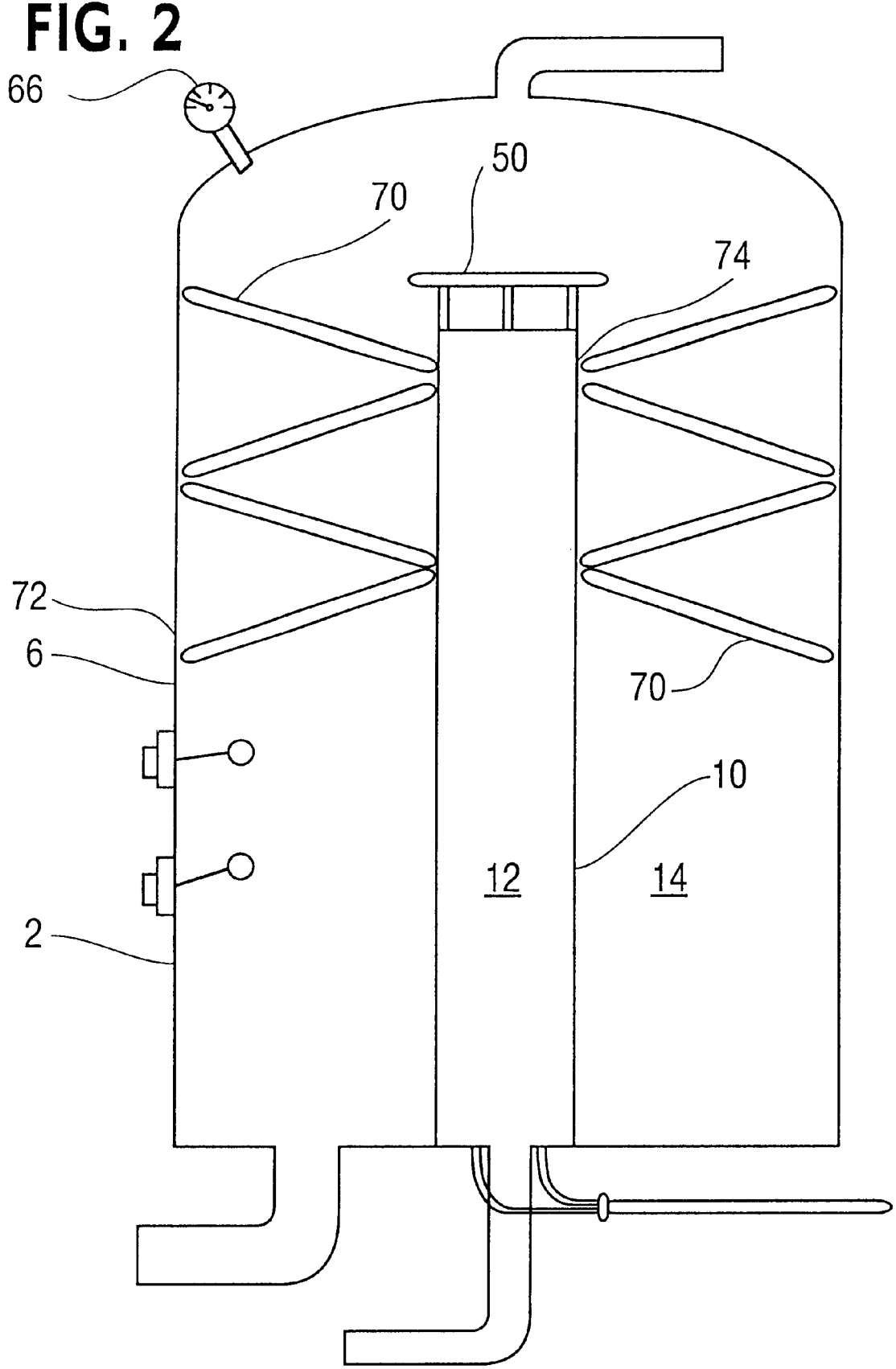
FIG. 2 is a longitudinal sectional view of a first possible variant of the apparatus shown in FIG. 1.

Although the obstruction component 52 for increasing the oil interface preferably is in the form of a packing material as described above, it is also within the scope of the invention to use other obstruction components that serve to expose the oil flowing downward in the second stage of the process to a large surface area. For example, instead of the packing shown in FIG. 1, the obstruction component could comprise a plurality of downwardly inclined annular disks 70 as in FIG. 2. The disks 70 are arranged one below the other and alternately attached to the tube 11 and side wall 6 at the respectively inner and outer periphery thereof, to form gaps 72, 74 with the side wall and tube, respectively, at the opposite peripheral edge of the disks. This will cause the oil to flow "zigzag-like" in a thin layer down along the upper surfaces of the annular disks 70 before being collected at the lower part of the column.

Figure 3:
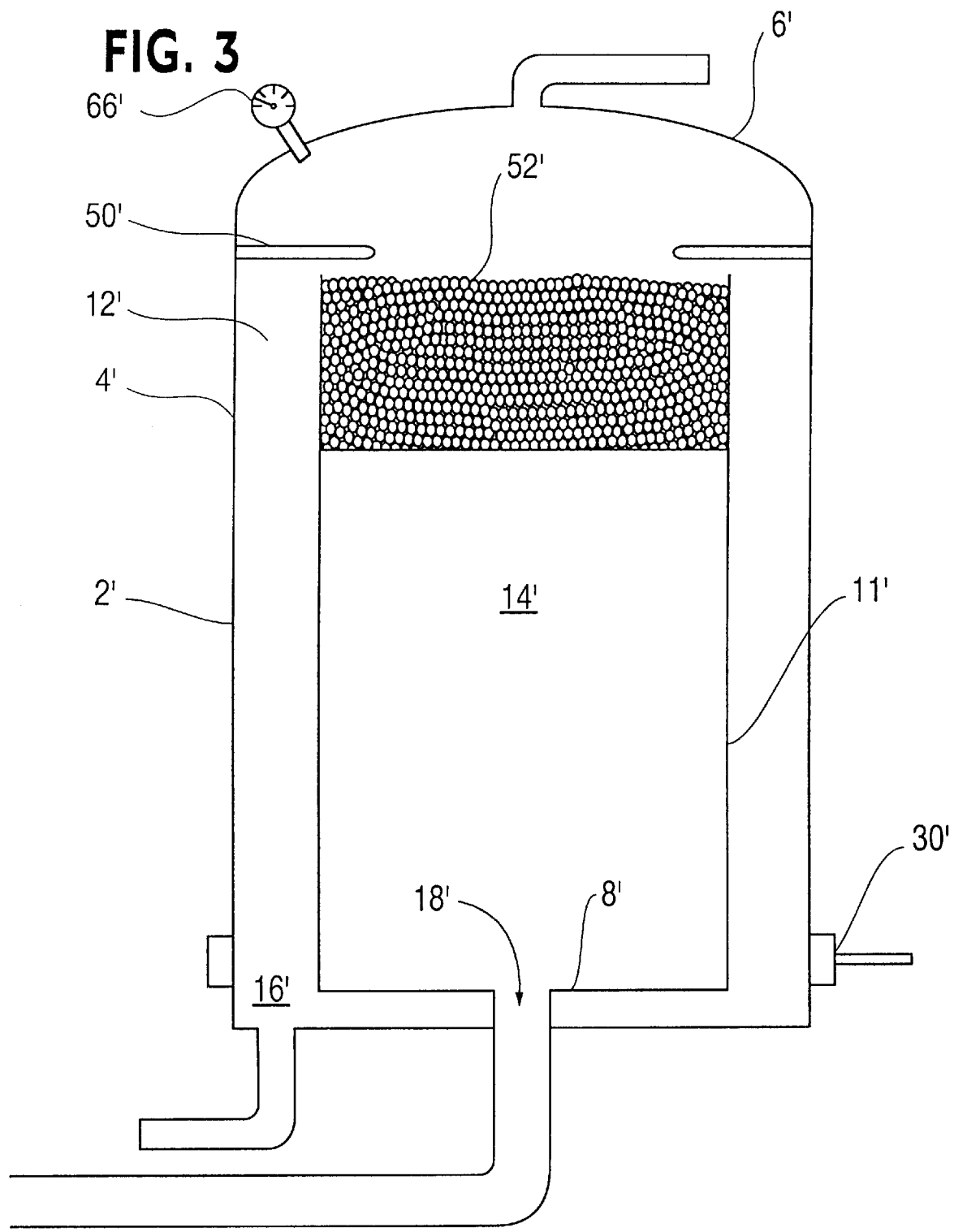
FIG. 3 is a longitudinal sectional view of a second possible variant of the apparatus shown in FIG. 1.

Also in other respects the configuration of the apparatus according to the invention is not limited to that shown in FIG. 1 and described above. Specifically, the first section of the container (i.e., the region where the oil and gas flow upward during the first stage of the process according to the invention) and the second section of the container (i.e., the region where the oil sinks down during the second stage of the process according to the invention) could be configured in many different ways. FIG. 3 indicates a variant in which the first and second sections are changed around (i.e., inverted) as compared to the embodiment shown in FIG. 1. In the example of FIG. 3, the side, top and bottom walls 4', 6', 8' of container 2' are substantially similar to those of the embodiment according to FIG. 1, and the partition wall 10' is again in the form of a central tube 11'. However, tube 11' has a substantially larger diameter than that of tube 11 of FIG. 1. Thus, in this alternative embodiment the relatively narrow annular space between tube 11' and column side wall 6' forms the apparatus first section 12' through which the oil flows up from oil inlet 16', while the interior of tube 11' forms the apparatus second section 14' through which the oil, upon impacting the annular baffle plate 50', flows down past the obstruction component 52' (in the case, packing) before being collected at the lower part of the column and pumped out through the central oil outlet 18'. The air intake is here preferable in the form of an annular passage 30' provided with nozzles.

The column and its two sections need not be cylindrical. Thus, a rectangular configuration could be contemplated having a straight partition wall near one of the side walls, dividing the container in a first section of small cross sectional area and a second section of large cross sectional area.

What is claimed is:

1. A method of separating water from oil, comprising:

heating the oil having the water therein;

drawing a vacuum in a container;

introducing the heated oil into a first section of the container subjected to the vacuum such that the oil flows upward through the first section due to the vacuum;

introducing a gas into the oil in the first section of the container such that gas bubbles rise through the oil so as to absorb water vapor from the oil;

removing the gas having the water vapor from a top portion of the container;

introducing the oil into a second section of the container from the first section of the container, the second section having an obstruction component therein, wherein the oil is introduced into the second section so as to flow downward through the second section and spread around the obstruction component such that the surface area of the oil is increased; and collecting the oil in a bottom portion of the second section of the container.

2. The method of claim 1, wherein the heated oil is introduced with the gas into a bottom portion of the first section of the container.

3. The method of claim 2, wherein the gas comprises ambient, non-preheated atmospheric air.

4. The method of claim 2, wherein said heating of the oil comprises heating the oil to 60° C.

5. The method of claim 2, wherein said drawing of a vacuum in the container comprises drawing a vacuum of at least 0.8 bar.

6. The method of claim 5, wherein said drawing of a vacuum in the container comprises drawing a vacuum of 0.85 bar.

7. The method of claim 5, wherein said heating of the oil comprises heating the oil to 60° C.

8. The method of claim 5, wherein the gas comprises ambient, non-preheated atmospheric air.

9. The method of claim 1, wherein said drawing of a vacuum in the container comprises drawing a vacuum of at least 0.8 bar.

10. The method of claim 9, wherein said drawing of a vacuum in the container comprises drawing a vacuum of 0.85 bar.

11. The method of claim 9, wherein said heating of the oil comprises heating the oil to 60° C.

12. The method of claim 9, wherein the gas comprises ambient, non-preheated atmospheric air.

13. The method of claim 1, wherein said heating of the oil comprises heating the oil to 60° C.

14. The method of claim 13, wherein the gas comprises ambient, non-preheated atmospheric air.

15. The method of claim 1, wherein the gas comprises ambient, non-preheated atmospheric air.

16. An apparatus for separating water from oil, comprising:

a container having a water-containing oil inlet, an oil outlet, a gas inlet for introducing gas into the water-containing oil in the container, a gas outlet for withdrawing gas having water vapor from a top portion of the container;

a substantially vertical partition wall arranged in an interior of said container below said gas outlet so as to divide said interior of said container into a first section and a second section, said water-containing oil inlet and said gas inlet being located at a bottom portion of said first section, said oil outlet being located at a bottom portion of said second section;

a baffle plate spaced above said first section of said container for directing a flow of the oil to be introduced into said first section by said water-containing oil inlet from a top portion of said first section into said second section; and an obstruction component at a top portion of said second section for spreading out the oil directed into said second section so as to increase a surface area of the oil.

17. The apparatus of claim 16, wherein said partition wall comprises a tube arranged along a longitudinal central axis of said container.

18. The apparatus of claim 17, wherein said first section of said container comprises an interior of said tube.

19. The apparatus of claim 17, wherein said second section of said container comprises an interior of said tube.

20. The apparatus of claim 16, wherein said obstruction component comprises packing material.

21. The apparatus of claim 20, wherein said packing material comprises a plurality of marbles.

22. The apparatus of claim 21, wherein each of said marbles is formed of one of glass material and ceramic material.

23. The apparatus of claim 17, wherein said obstruction component comprises a plurality of annular downwardly-inclined disks alternately fixed to an outer surface of said tube and an inner surface of said container.

* * * * *